United States Patent [19]
Niskin

[11] 3,793,889
[45] Feb. 26, 1974

[54] THERMOMETER REVERSING APPARATUS

[76] Inventor: Shale J. Niskin, 5535 N. W. 7th Ave., Miami, Fla. 33127

[22] Filed: Feb. 7, 1973

[21] Appl. No.: 330,268

[52] U.S. Cl. .............................. 73/425.4 R, 73/354
[51] Int. Cl. ............................................... G01n 1/10
[58] Field of Search... 73/425.4 R, 343 R, 354, 374, 73/425.2, 344, 371; 248/291, 296

[56] References Cited
UNITED STATES PATENTS

| | | | |
|---|---|---|---|
| 3,242,740 | 3/1966 | Niskin | 73/425.4 R |
| 2,270,211 | 1/1942 | Bruns | 73/375 |
| 2,435,816 | 2/1948 | Anderson | 248/291 X |

Primary Examiner—Richard C. Queisser
Assistant Examiner—Daniel M. Yasich
Attorney, Agent, or Firm—Salvatore G. Militana

[57] ABSTRACT

A thermometer reversing apparatus having a case for containing thermometers therein rotatably and releasably secured to a rotatable ring member that is mounted on a mounting member which in turn is mounted on a water sampler bottle. A pair of bolts which are secured to the ring member have heads received by enlarged openings in the thermometer case which upon sliding into smaller communicating openings locks the case to the ring member by means of a retractable locking pin that is mounted on the ring member and is slid into an opening in the thermometer case. A rotatable stop member which maintains the thermometer case and the ring member in locked position by preventing the sliding of the locking pin out of the opening in the thermometer case may be rotated to permit release of the locking pin and the thermometer case to be removed from the rotatable ring member.

5 Claims, 9 Drawing Figures

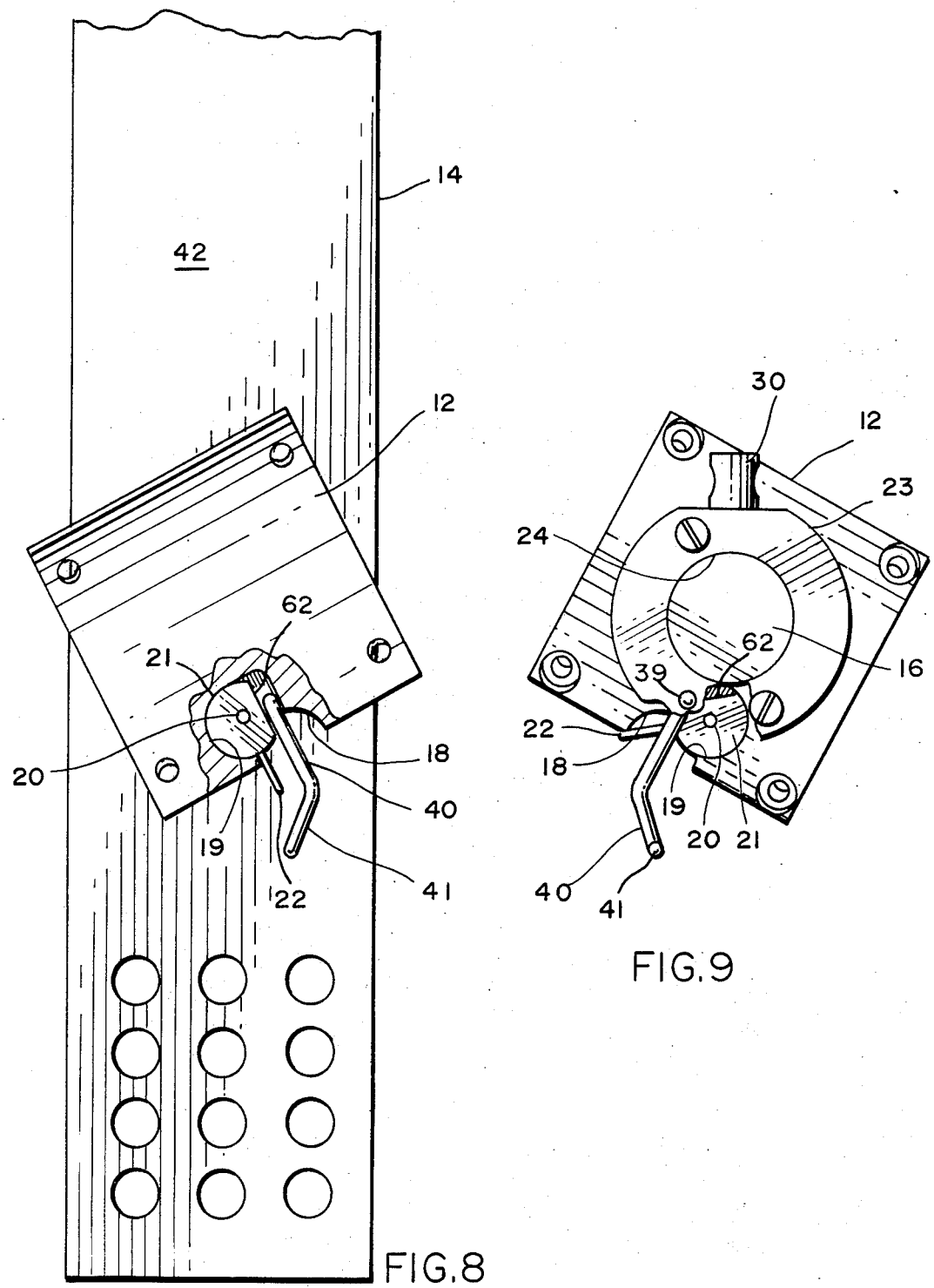

THERMOMETER REVERSING APPARATUS

CROSS REFERENCES TO RELATED APPLICATIONS

This invention is an improvement on the thermometer reversing apparatus shown and described in my U.S. Pat. No. 3,242,70, entitled Water Sampler System issued on Mar. 29, 1966.

BACKGROUND OF THE INVENTION

1. Field of the Invention

This invention relates generally to a device for mounting reversing thermometers on water sampling apparatus and is more particularly directed to a thermometer containing case that is readily secured in position on a rotatable ring member which permits the reversing of the thermometer and is as readily removed therefrom.

2. Description of the Prior Art

Prior to applicant's invention as shown and described in his U.S. Pat. No. 3,242,740, all devices for collecting samples from the ocean and other bodies of water that provided for reversing thermometers would rotate the thermometer by rotating the entire apparatus including the bottle of water. Applicant's patent disclosed a device for reversing the position of the thermometer by itself without changing the position of the water sampler bottle. However, the mounting for the thermometer containing case is permanently affixed to the water sampler so that the thermometer containing case could not be separated from the sampler. Consequently the thermometers had to be removed from the case when the thermometers were to be examined for the temperatures recorded thereon. Since the thermometers are fragile and had to be handled with a great deal of care, after samples of water were taken and the apparatus brought up to the surface of the water, the entire water sampler bottle with the thermometers and their cases affixed thereto were removed as a unit and brought to the laboratory for removal of the thermometers. Since a great deal of time would elapse between the interim between the temperature of the water being registered on the thermometer and the recording of that temperature so that the true temperature of the water would be different from that read off the thermometer. In order to obtain the actual temperature of the water from a reversing thermometer, the period between the taking of the water temperature and the reading of that temperature from the thermometer should be as brief as possible.

SUMMARY OF THE INVENTION

Therefore, it is a primary object of the present invention to provide a thermometer reversing apparatus for water sampler bottles with a thermometer containing case which is readily mounted on the bottle and just as readily removed therefrom in order to read the temperatures recorded thereon.

Another object of the present invention is to provide a theremometer reversing apparatus with a thermometer containing case which rotates through an arc of approximately 180° when a messenger is caused to operate the release device thereof and which is removed from the apparatus along with the thermometers in order to record an accurate temperature of the water at the moment of the reversing release device.

A further object of the present invention is to provide a case for thermometers that is readily mounted on a reversing apparatus for recording temperatures of water at designated depths wherein the case is provided with bayonet type openings for securing the case to a mounting ring rotatably mounted on a water sampler bottle and a lock pin for releasably securing the case to the mounting ring to permit a quick mounting and dismounting of the theremometer case to the mounting ring.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or mofified so long as such changes or modifications mark no material departure from the salient features of the invention as expressed in the appended claims.

BRIEF DESCRIPTION OF THE DRAWINGS

In the drawings:

FIGS. 4 and 5 are cross sectional views taken along the lines 4—4 and 5—5 respectively of FIG. 2.

FIG. 8 is a rear elevational view of my device partially broken away as shown removed from the water sampler bottle.

FIG. 9 is a view opposite that of FIG. 8 of the mounting apparatus as seen removed from the thermometer case.

DESCRIPTION OF THE PREFERRED EMBODIMENT

Figure 1:
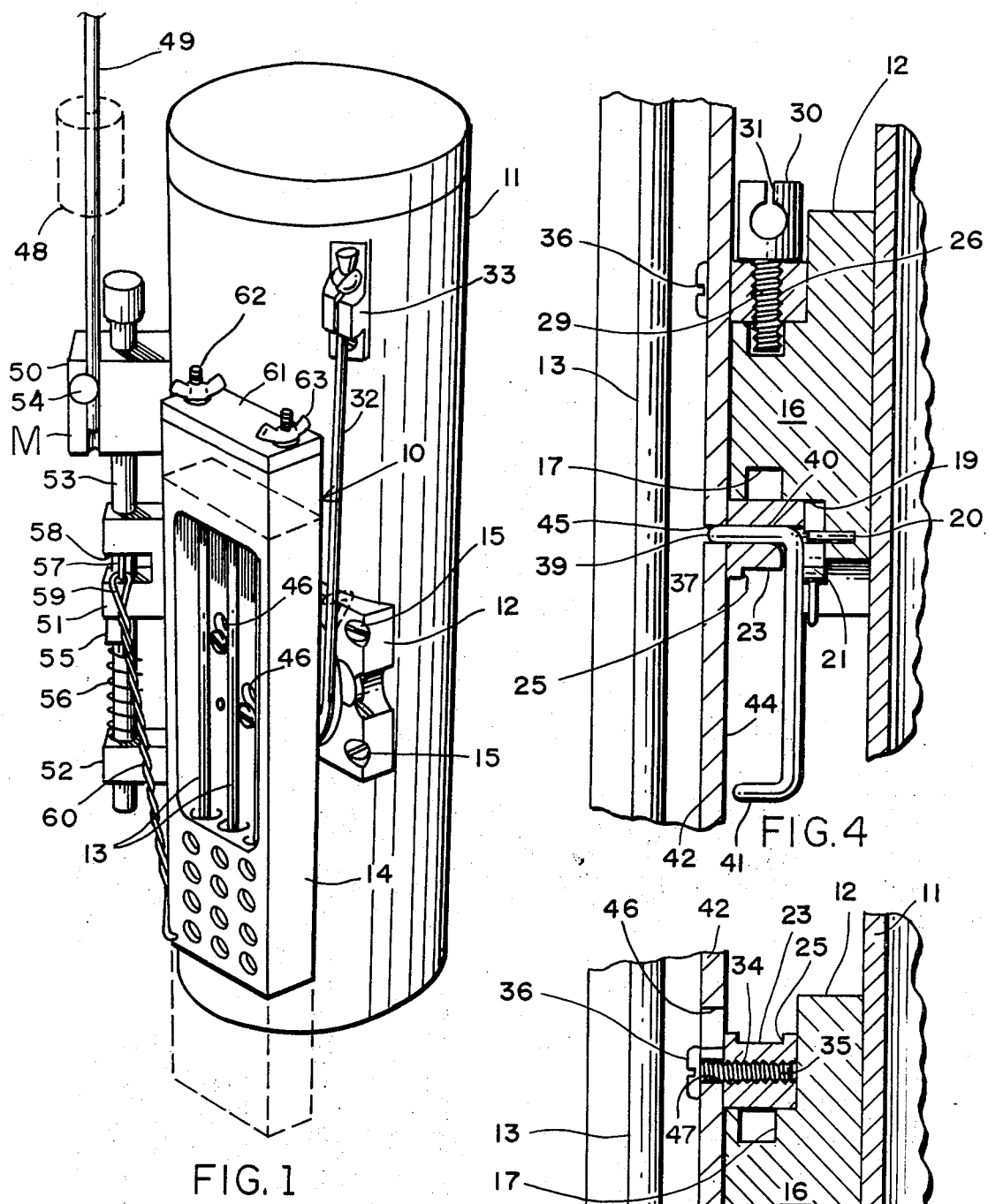
FIG. 1 is a perspective view of a water sampler bottle on which my thermometer containing and reversing apparatus is mounted.
Figure 2:
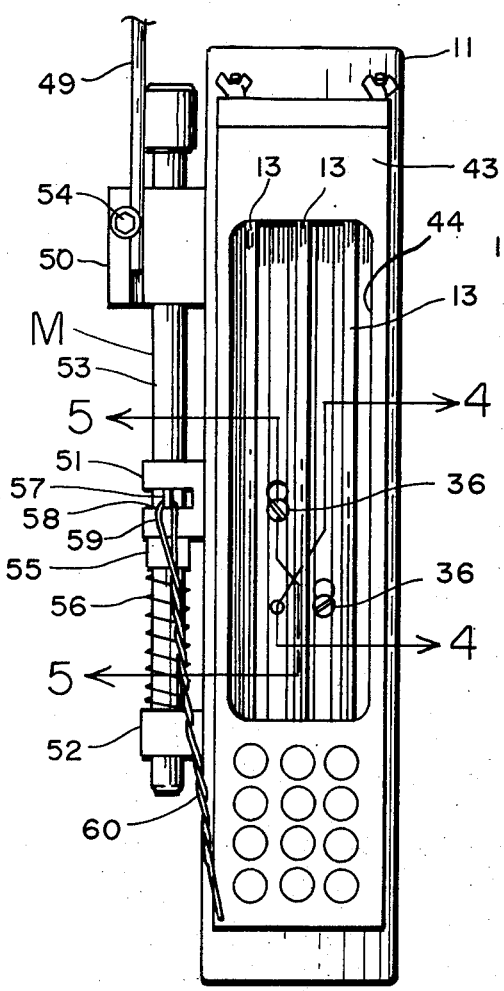
FIGS. 2 and 3 are side elevational views thereof, the dotted lines in FIG. 3 showing the device after the thermometers have been reversed.
Figure 3:
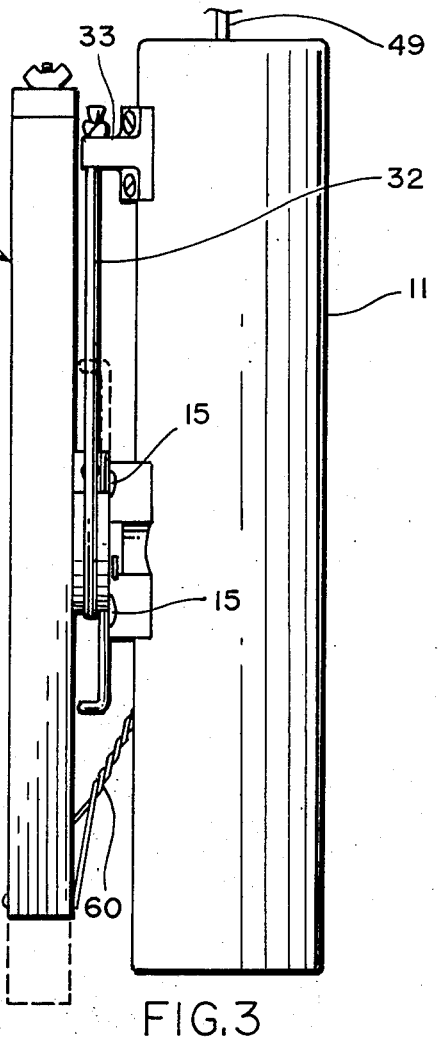

Referring to the drawings wherein like numerals are used to designate similar parts throughout the several views, the numeral 10 refers to my thermometer reversing apparatus which is shown mounted on a water sampling bottle 11. The bottle 11 which forms no part of the present invention collects a bottle of sea water at a prescribed depth, at which depth the thermometer reversing apparatus 10 as is explained in detail hereinafter, is operated to rotate about its base mounting member 12 approximately 180°. The thermometers 13, of which there are three in number, are housed in a case 14, are reversing thermometers that upon being reversed in position will retain the temperature recorded at the moment they are rotated. By using three such thermometers the exact depth of water at the moment of reversing may be ascertained.

The mounting member 12 fastened to the water sampler 11 by bolts 15 is provided with an integrally mounted cylindrical hub 16 having a peripheral groove 17 about which the thermometer case 14 rotates. At the lower edge portion of the mounting member 12 there are two slots 18 and 19, (See FIGS. 8 and 9) slot 18 extending through the entire thickness of the mounting member while the slot 19 extends only partially therethrough to provide a support for a pivot pin 20. The latter provide rotational movement for a stop member 21 having a lock pin 22 extending therefrom. The lock member 21 is circular in configuration with a flat or truncated side 62 on one portion of its periphery.

A mounting ring 23 is provided with a central opening 24 for rotational movement about the hub 16. The peripheral edge portion of the ring 23 is provided with a slot 25 and a pair of oppositely positioned threaded bores 26 and 27 for receiving plastic bolts 28 and 29 respectively whose ends project into the peripheral groove 17 for locking the ring 23 and hub 16 together but permitting the ring 23 to rotate about the hub 16. The bolt 29 extends beyond the hub 16 as at 30 terminating in an open slot 31 for retaining the end of an elastic member 32 that extends about the ring 23 lying in the peripheral groove 25 and whose other end is secured to a bracket 33 that is mounted on the bottle 11.

Positioned on the face of the mounting ring 23 are two threaded bores 34 for receiving bolts 35 having enlarged heads 36. The bores 34 are of a certain depth to permit threading the bolts 35 therein whereby the heads 36 are positioned a predetermined distance from the surface of the ring member 23. Also, found on the mounting ring 23 is a bore 37 which extends through the ring 23 communicating with an open slot 38 formed on the rear portion of the ring 23. Positioned in the bore 37 is the tip 39 of a combined lock and brake rod 40. The tip portion 39 extends at right angle to the main body of the rod 40 and is substantially longer than the thickness of the mounting ring 23. As is explained in detail hereinafter, the tip portion 39 operates as a releasable locking member for securing the ring 23 to the mounting member 12 while the other end portion 41 operates as a brake which stops the continued rotation of the mounting ring 23 by impinging on the elastic member 32 that normally causes the rotation of the mounting ring 23 and the thermometer case 14 to which it is attached.

The thermometer case 14 is a rectangular receptacle having a rear wall 42, upper and lower front walls 43 to form a chamber 44. Longitudinal cavities are formed in the chamber 44 for receiving the three reversing thermometers 13. The rear wall 42 is provided with bores or openings 45, 46 and 47, the bore 45 receiving the tip 39 of the rod 40 while the pair of cummunicating openings 46 and 47 form bayonet type openings for receiving the exposed ends of the bolts 35 with the head 36 of the bolts 34 being received by the larger bores 46. With the heads 36 of the bolts 35 engaging the inner surface of the rear wall 42 of the thermometer case 14, the latter is shifted to slide the bolts 35 into the smaller openings 47 to lock the thermometer case 14 to the mounting ring 23.

There is longitudinally mounted on the bottle 11 a relay messenger operated device -M- that restrains the rotation of the thermometer case 11 until a desired depth of water has been reached and a messenger such as a weight 48 that slides down a line 49 shown in dotted lines in FIG. 1 operates to actuate a release of the restraint as explained hereinafter. A plurality of brackets 50, 51 and 52 are secured to the bottle 11 with each of the brackets having an opening that is in vertical alignment for receiving a rod 53 slidably positioned therein. The line 49 is secured as at 54 to the side of the uppermost bracket 50. The rod 53 is provided with a collar 55 forming a shoulder that engages the lower surface of the bracket 51 by virtue of a coil spring 56, the latter extending between the collar 55 and the lowermost bracket 52. Extending upwardly of the collar 55 is a pin 57 that extends through a bore in the bracket 51 and across an open portion formed by a slot 58 that extends across the mid-portion thereof. The pin 57 engages a loop 59 of a restraining line 60 whose other end is secured to the bottom portion of the thermometers case 14. The theremometers 13 are inserted and removed from the case 14 through a removable cover 61 that is fastened to the top of the case 14 by studs 62 and wing nuts 63.

It can readily be seen that when the water sampler 11 is at the depth at which a sample of water is being obtained and the thermometers 13 have registered the temperature thereof, the weight 48 is released and permitted to slide down the line 49. When the weight strikes the top end of the rod 53, the latter will slide downwardly against the spring force 56 to cause the pin 57 to slide downwardly and release the loop 59 of the restraining line 60. The elastic member 32 which had been tensioned by being wound about the ring 23 and its ends secured to the retaining members 30 and 33, will now cause the thermometer case 14 to rotate about an arc of approximately 180° when the end portion 41 of the rod 40 abuts against the elastic member 32 to stop the rotation of the thermometer case 14. The thermometer readings will now be unaffected by changes in water temperature as the water sampler bottle 11 is brought to the surface of the water.

Figure 6:
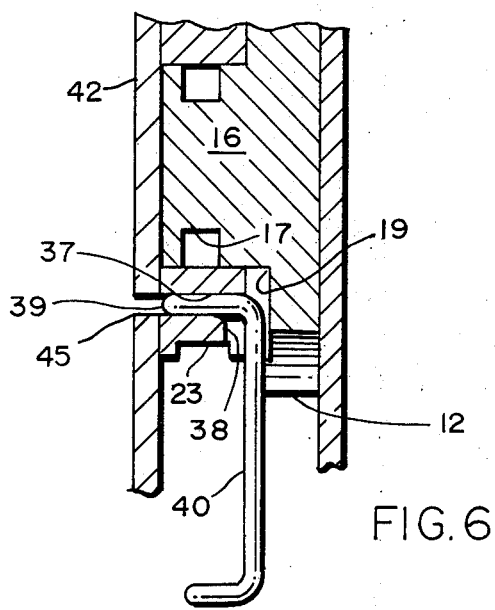
FIG. 6 is a fragmentary view similar to that of FIG. 4 with its locking device in the release position to permit removal of the thermometer holder.
Figure 7:
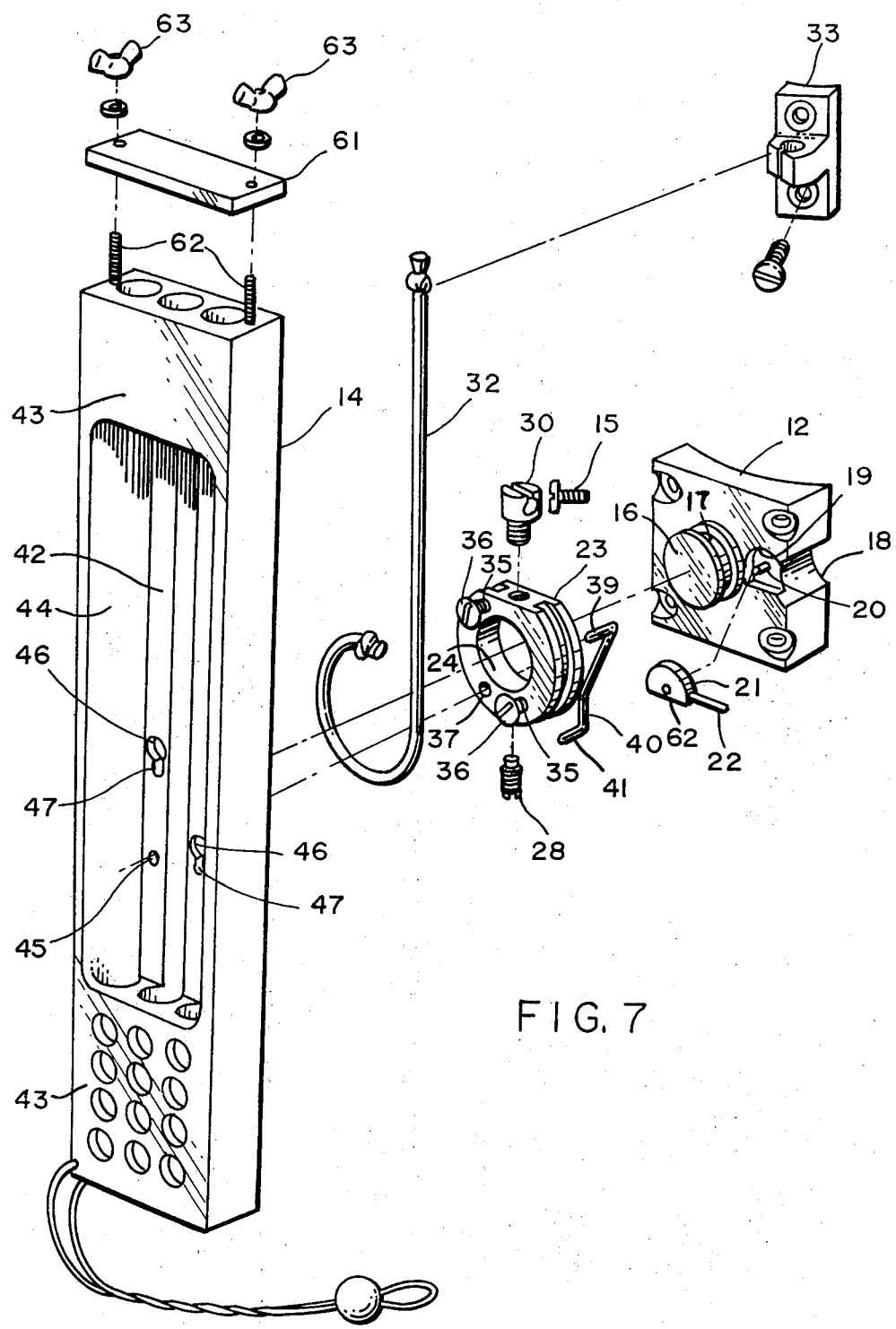
FIG. 7 is an exploded view of my thermometer holder and release apparatus.

At this time the thermometer case 11 is quickly and readily removed from its mounting 12 on the bottle 11 by simply swinging the lock pin 22 clockwise as seen in FIG. 8 or counterclockwise as viewed in FIG. 9, thereby causing the truncated portion 62 of the stop member 21 to become aligned with the cavity in the bore 19 formed by the flat edge portion 62 of the lock member 21 lying parallel and in spaced relation to the lock rod 40. Now, the lock and brake rod 40 is slid rearwardly of the bore 37 from the position shown by FIG. 4 to that shown by FIG. 6 whereby the tip 39 and the lock and brake rod 40 is removed from the bore 45 and clear of the rear wall 42 of the thermometer case 14.

The thermometer case 14 can now be slid downwardly on the bolts 35 to move the bolts 35 from the position of the bores 47 to that of the enlarged bores 46 which permit the thermometer case 14 to be removed from the mounting member 12 as the heads 36 of the bolts 35 slip through the openings 46. The thermometer case 14 with the thermometers 13 therein can now be safely and carefully brought to the laboratory where the readings on the thermometers 13 are noted and then later thermometers 13 removed to be restored to its original reading for reuse.

The remainder of the apparatus 10 such as the mounting member 12, mounting ring 23, bracket 33 and messenger operated mechanism -M- are not removed from the bottle 11 so that upon reuse of the bottle 11, all that need be done is return the thermometer case 14 to the bottle 11 by placing the head of the bolts 36 in the openings 46 and then sliding the case 14 downwardly until the bolts 47 are received by the smaller bores 47. The lock rod 40 is then pushed forwardly along the bore 37 of the mounting ring 23 until the tip 39 of the rod 40 is received by the bore 45 of the rear wall 42 of the thermometer case 14, the latter now being secured to the mounting ring 23. Upon rotating the stop member 21 by means of the rod 22 in a clockwise direction as seen in FIG. 9, the stop member 21 will engage the lock rod 40 to prevent the tip 39 of the lock and brake rod 40 from sliding outwardly of the opening 45, so that the thermometer case 14 remains secured at all times to the mounting ring 23 which in turn is rotatably mounted on the mounting member 12 secured to the bottle 11.

With the thermometer case 14 mounted on the bottle 11 as aforesaid, the case 14 is now rotated clockwise to the position shown by FIG. 1 causing the mounting ring 23 to rotate therewith to tension the elastic member 32. A downward force is applied on the top end of the rod 53 to depress the pin 57 to receive the loop 59 of the line 60. Upon releasing the rod 53, the pin 57 engages the loop 59 and thereby prevents the rotation of the thermometer case 14 until such time as the rod 53 is depressed by the force of the falling messenger weight 48.

What I claim as new and desire to secure by Letters Patent of the United States is:

1. In a water sampling device including thermometer reversing apparatus having one or more thermometers therein comprising a case for retaining the thermometers having a rear wall, a grooved mounting ring, means releasably securing said thermometer case to said mounting ring, a base member secured to said water sampling device, said base member having a substantially cylindrical hub portion and a peripheral groove formed about said hub portion, means mounted on said mounting ring and received by said peripheral groove permitting the rotation of said mounting ring about said hub portion, flexible means secured at one end to said mounting ring and the other end to said water sampling device selectively and yieldingly urging the rotation of said mounting ring and said thermometer case and restraining means selectively secured to said thermometer case preventing the rotation of said case.

2. The structure as recited by claim 1 wherein said releasable securing means comprises at least one bolt secured to said mounting ring, said bolt having an enlarged head portion in spaced relation to said mounting ring, a first opening positioned on said rear wall receiving said enlarged head portion, a second opening smaller in diameter than said first opening communicating with said first opening and receiving said bolt upon the movement of said case relative to said mounting ring whereby said case is secured to said mounting ring, a third opening positioned on said rear wall and first pin means movably mounted on said mounting ring and received by said third opening for releasably preventing the movement of said thermometers case on said mounting ring.

3. The structure as recited by claim 2 taken in combination with a lock member rotatably mounted on said base member engaging said pin means for releasably preventing the movement of said pin means.

4. The structure as recited by claim 3 wherein said lock member is rotatably mounted in a cavity formed on said base member adjacent said hub portion, said lock member being substantially cylindrical with a truncated portion along one side thereof, pin second means rotatably mounting said lock member in said cavity whereby said truncated portion may be aligned with said first pin means to permit movement thereof for releasing said thermometer case from said mounting ring.

5. The structure as recited by claim 4 wherein said first pin means engages said flexible means upon the rotation of said mounting ring and said thermometer case and braking said case.

* * * * *